United States Patent
Kaufman

(10) Patent No.: US 10,205,594 B1
(45) Date of Patent: Feb. 12, 2019

(54) CRYPTO-ERASURE RESILIENT TO NETWORK OUTAGE

(71) Applicant: EMC Corporation, Hopkinton, MA (US)

(72) Inventor: Charles W. Kaufman, Redmond, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 258 days.

(21) Appl. No.: 15/085,890

(22) Filed: Mar. 30, 2016

(51) Int. Cl.
*H04L 29/06* (2006.01)
*H04L 9/08* (2006.01)

(52) U.S. Cl.
CPC ............ *H04L 9/0891* (2013.01); *H04L 9/083* (2013.01)

(58) Field of Classification Search
CPC .............................. H04L 9/0891; H04L 9/083
See application file for complete search history.

(56) References Cited

U.S. PATENT DOCUMENTS

| | | | | |
|---|---|---|---|---|
| 5,491,750 A | * | 2/1996 | Bellare | H04L 9/0822 380/279 |
| 5,621,795 A | * | 4/1997 | Baker | H04L 9/083 380/277 |
| 8,166,314 B1 | * | 4/2012 | Raizen | G06F 21/78 711/164 |
| 8,261,068 B1 | | 9/2012 | Raizen et al. | |
| 8,265,004 B2 | * | 9/2012 | Toutonghi | H04W 8/005 370/328 |
| 8,311,225 B2 | | 11/2012 | Singh et al. | |
| 8,416,954 B1 | | 4/2013 | Raizen et al. | |
| 8,966,281 B1 | | 2/2015 | Raizen et al. | |
| 9,258,120 B1 | * | 2/2016 | Allen | H04L 9/0894 |
| 9,819,648 B1 | * | 11/2017 | Chilakapati | H04L 63/0428 |
| 2005/0198170 A1 | * | 9/2005 | LeMay | H04L 63/045 709/206 |
| 2009/0198997 A1 | * | 8/2009 | Yeap | H04L 63/0823 713/155 |
| 2009/0245519 A1 | * | 10/2009 | Cachin | G06F 21/6209 380/277 |
| 2010/0223458 A1 | * | 9/2010 | McGrew | H04L 9/0833 713/153 |
| 2013/0182842 A1 | * | 7/2013 | Fasoli | H04N 21/2347 380/255 |
| 2017/0104735 A1 | * | 4/2017 | Brown | H04L 63/061 |

* cited by examiner

*Primary Examiner* — Sarah Su
(74) *Attorney, Agent, or Firm* — BainwoodHuang

(57) ABSTRACT

Examples are generally directed towards providing a server polling component for remote cryptographic key erasure resilient to network outage. A set of keys received from a server are stored on data storage. The data storage sends a status request to the server. If a key enabled status is received, the data storage continues normal operations. If a key disabled status is received, a key failure action is performed. The key failure action includes deleting one or more of the keys in the set of keys or shutting down one or more storage devices of the data storage. If no response is received from the server, the data storage iteratively resends the status request at retry time intervals until a response is received from the server or until a time out period expires. On expiration of the time out period, the key failure action is performed.

9 Claims, 8 Drawing Sheets

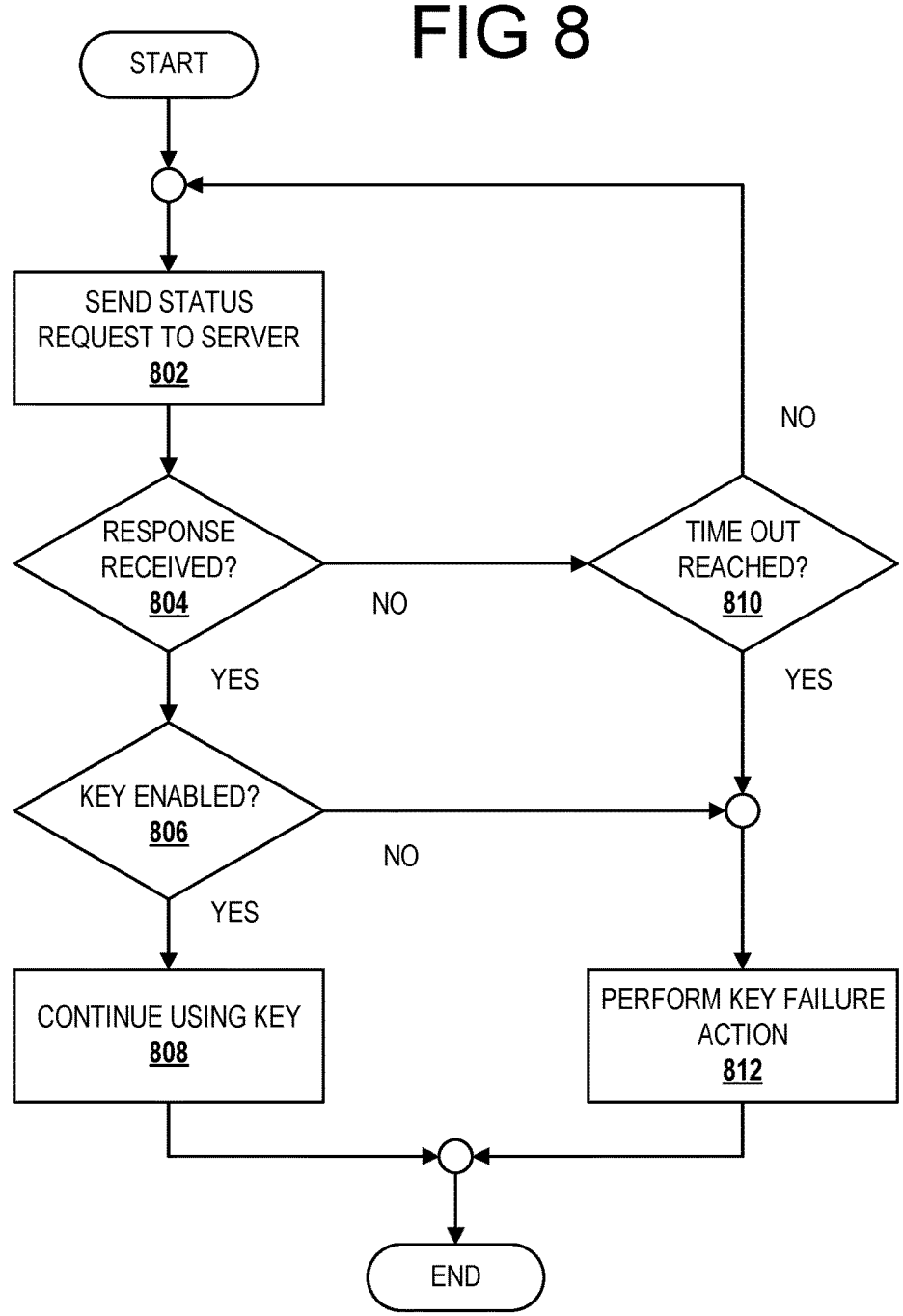

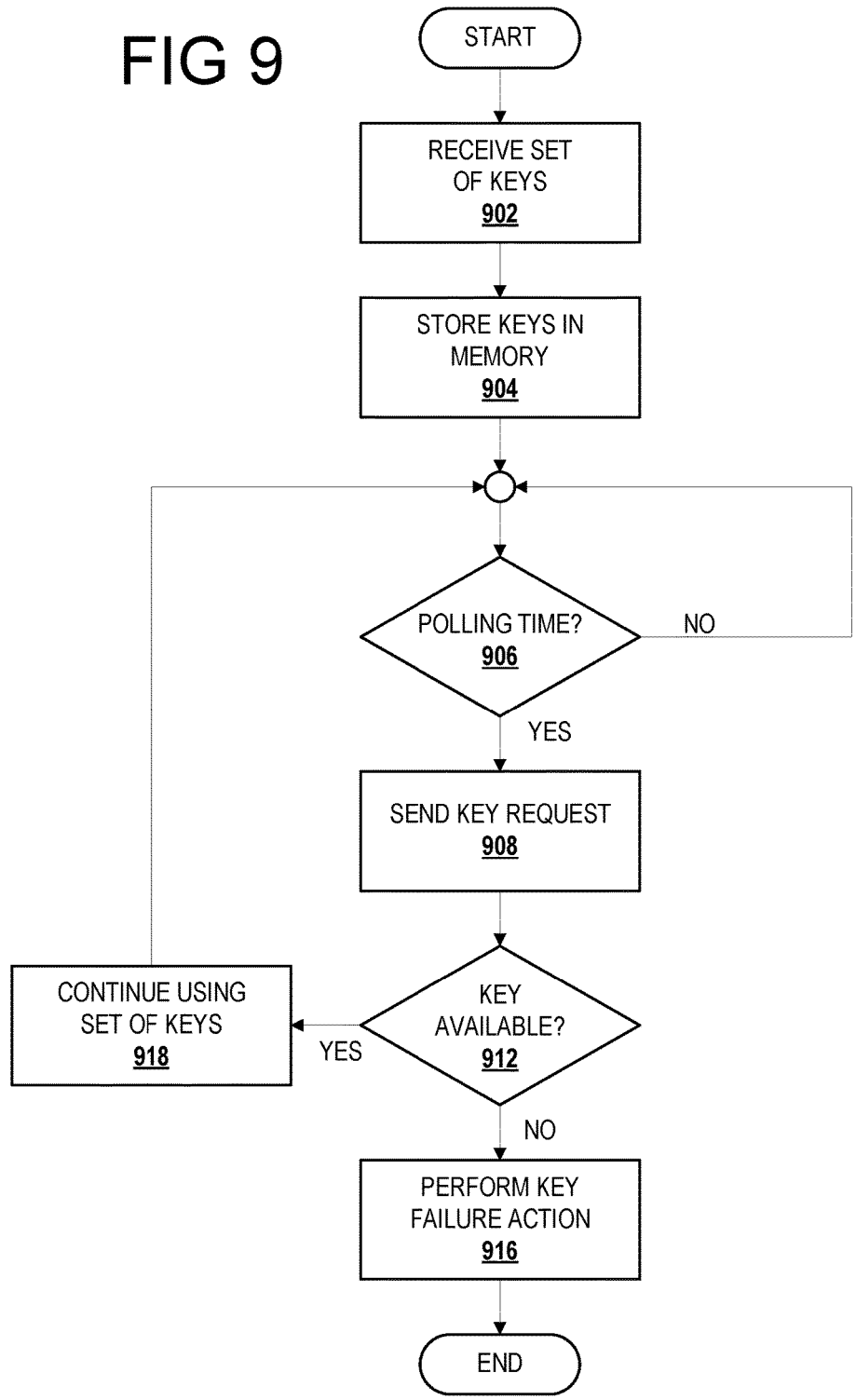

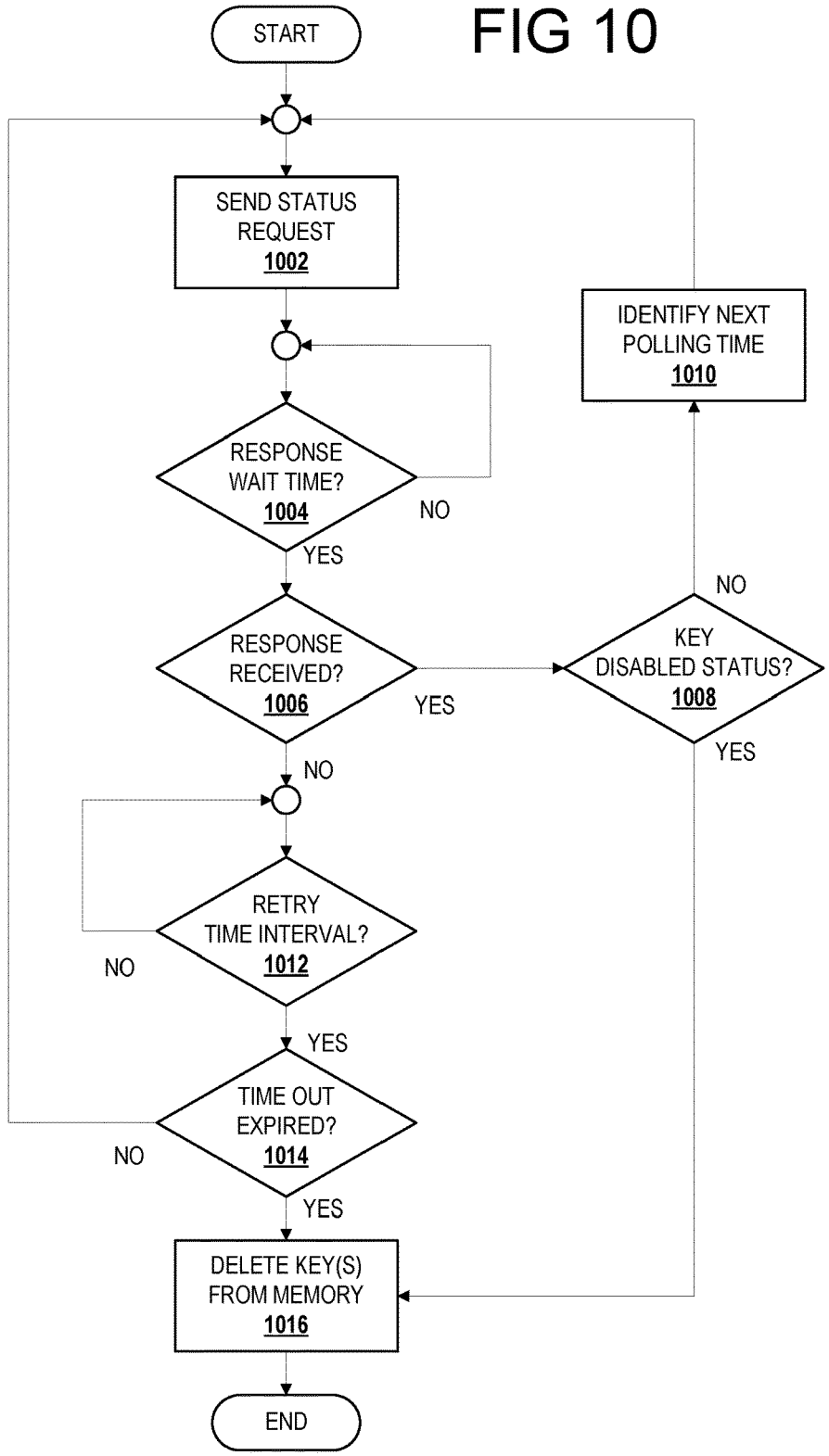

(12) United States Patent
US 10,205,594 B1

CRYPTO-ERASURE RESILIENT TO NETWORK OUTAGE

BACKGROUND

It is desirable to prevent an unauthorized party reading data on data storage. Some data storage systems utilize Data at Rest Encryption (DARE) to protect data from unauthorized access. DARE involves encoding data based on one or more cryptographic keys. Some data storage systems generate and store key(s) on the data storage. However, this may increase the probability of an unauthorized party obtaining both the encrypted data and the key(s). Therefore, some storage systems utilize an external key server to store the key(s) separately from the storage system. A key server may also be referred to as a key manager.

An external key server is frequently used for generating and storing keys because it is typically a self-contained system that is not downloading potentially malicious applications. When the data storage boots up, it authenticates to the key server and downloads the key(s) required to decrypt encrypted data stored on the data storage. Some systems download the key(s) from the key server every time data is decrypted. This results in performance problems and decreased efficiency. Therefore, some data storage systems maintain a local copy of the key(s) in volatile memory for decrypting data. The local copy of the key(s) is lost when the storage system powers down or reboots. However, an unauthorized party obtaining physical access to the data storage may be able to use the local copy of the key(s) to read encrypted data.

Some solutions require an ignition key on reboot. An ignition key may be a key, password or other information not stored on the data storage that is provided on reboot. Other solutions instruct a key server to stop sending key(s) if the data storage is in unauthorized hands. However, these solutions are only effective if the data storage is rebooted.

Other solutions send a message to the data storage instructing the data storage to delete local copies of key(s). However, this is ineffective if the data storage is disconnected from a network.

SUMMARY

Examples of the disclosure provide for a server polling process. In an example, a server polling component receives a set of keys from an external key server located remotely from data storage via a network connection. The set of keys includes at least one cryptographic key associated with encrypted data stored on the data storage. The set of keys are stored on a memory of the data storage. On occurrence of a polling time event, the server polling component sends a status request to the key server requesting a status of the set of keys. If a key available response is received from the key server, the data storage continues using the set of keys. The key available response indicates an enabled status of the set of keys. If a key unavailable response is received, the server polling component performs a key failure action. The key unavailable response indicates at least one key in the set of keys is disabled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is an exemplary flowchart illustrating a process for polling a server for a key status.

FIG. 9 is an exemplary flowchart illustrating a process for key server polling.

FIG. 10 is an exemplary flowchart illustrating a process for resending status requests to an unresponsive key server.

Corresponding reference characters indicate corresponding parts throughout the drawings.

DETAILED DESCRIPTION

Figure 1:
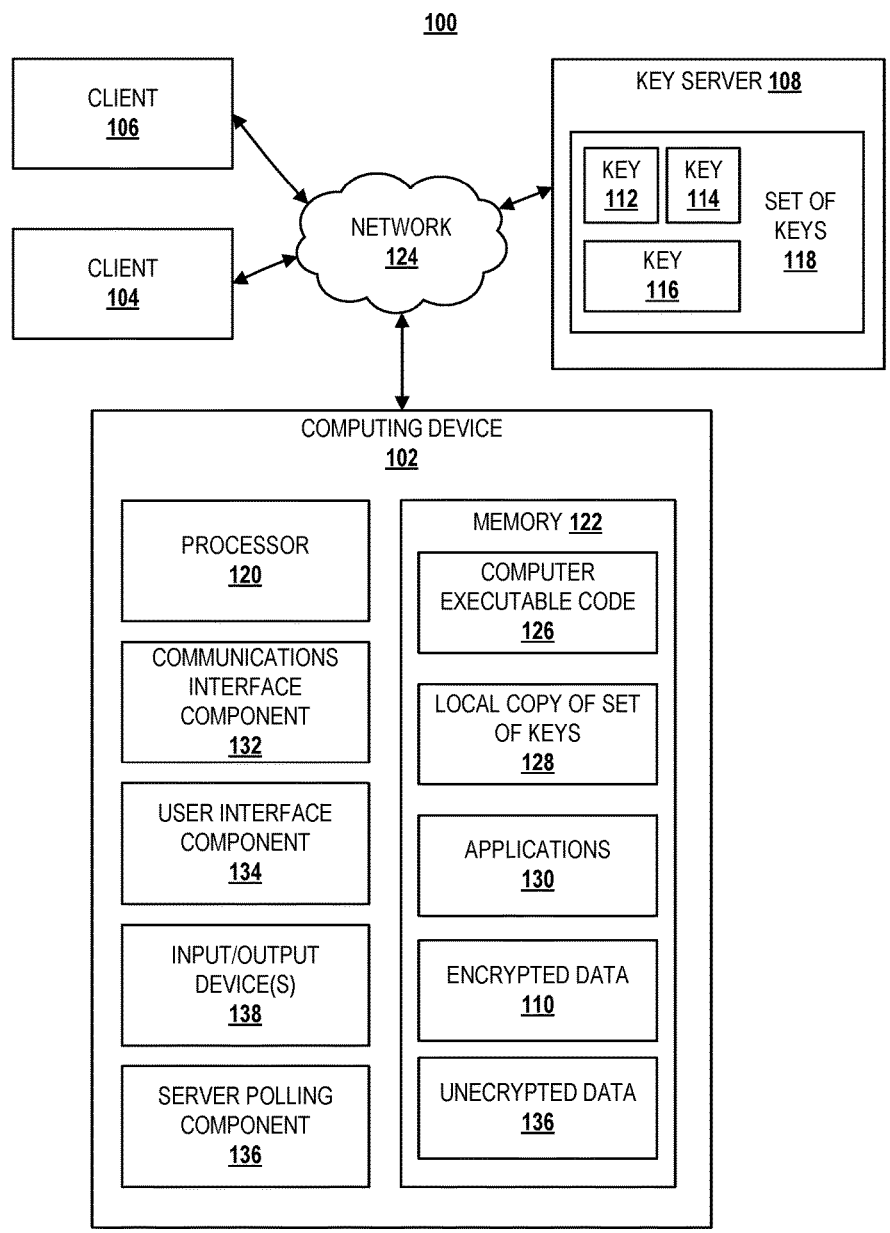
FIG. 1 is an exemplary block diagram illustrating a computing system including a server polling component.

Many storage systems utilize data at rest encryption (DARE) with keys to encrypt and decrypt data. As used herein, a storage system includes one or more file systems, one or more object systems, one or more databases, cloud storage, or any other type of data storage. A data storage system is a system dedicated to the job of managing data storage devices and providing a storage service accessible by other computing systems over a network. A data storage array is a type of data storage system. These systems frequently utilize one or more external key servers. An external key server is a server that generates, stores, and/or transmits one or more encryption keys. An external key server is located remotely or independently from the storage system.

Referring to the figures, some examples of the disclosure provide a server polling component on a computing system that polls one or more key servers for a status of the one or more keys. A computing system may include a single computing device, a set of one or more computing devices, and/or a data storage system. A data storage system includes, without limitation, a set of one or more data storage devices. In some examples, a data storage array may be implemented as part of cloud storage.

The server polling component sends a key request or a status request to a key server when a polling time event occurs. In some examples, a status request is a request for a status of one or more keys. In other examples, the status request is a key request. A key request is a request for one or more keys.

If a key is received in response to the key request or a key available response is received from the key server in response to a status request, the data storage continues using the set of keys. If a key unavailable response is received, the server polling component performs a key failure action. The key unavailable response is a response from the key server indicating that the requested key is unavailable or disabled. The server polling of some of the examples increases security of both stored encryption keys and stored data.

In other examples, if no response is received, the server polling component continues polling the server at predetermined retry time intervals. If no response is received within a threshold time out period, the key failure action is performed. The key failure action provides improved security for stored encrypted data.

The retry time intervals and time out period enables uninterrupted access to data storage during the time out period while enabling the storage system to shut down and/or delete keys if instructed to do so by the key server and/or if connectivity to the key server is lost for a predetermined period of time. The retry time interval enables the data storage to continue operating for a predetermined period of time until a response confirming the key is unavailable is received or until a time out expires. This retry time interval enables a reduced error rate in shutting down the data storage where there is a technical issue with the key server or loss of network connectivity at the key server.

In some examples, the key failure action includes deleting the one or more keys, shutting down all or part of the data storage, and/or initiating a reboot of the data storage. Shutting down the data storage and/or rebooting the data storage deletes local copies of the key(s) stored in volatile memory on the data storage to prevent unauthorized access to key(s). The key failure action protects encrypted data stored on the data storage and reduces likelihood of unauthorized access of data.

In this manner, the server polling prevents an unauthorized user having physical access to the data storage from obtaining and/or utilizing the local copies of the keys stored in volatile memory. The server polling of some of the examples provides for improved security of both the cryptographic keys and encrypted data. Thus, the server polling component improves user efficiency by providing users with more reliable and dependable access to data storage while periodically checking availability of keys to ensure security of encrypted data and encryption keys stored remotely from the data storage.

Moreover, the server polling eliminates the need to download the key(s) from the key server for every data decryption by improving security of the local copy of the key(s) stored on the data storage. In other words, the copy of the key(s) in some examples is stored locally to a data storage system and/or a computing system. This reduces network bandwidth usage, improves processor speed, and improves security of data during encryption and decryption.

FIG. 1 is an exemplary block diagram illustrating a computing system including a server polling component. Computing system 100 is a system for utilizing key server polling. Computing system 100 optionally includes one or more clients computing devices, such as computing device 102, client 104, and/or client 106.

Computing device 102 in this example represents any type of computing device executing instructions (e.g., as application programs, operating system functionality, or both) to implement the operations and functionality associated with the computing device 102. The computing device 102 includes a plurality of hardware components and a plurality of software components.

The computing device 102 may be implemented as a data processing system, a data storage device, cloud storage, a personal computer, kiosk, tabletop device, industrial control device, wireless charging station, an electric automobile charging station, or any other type of computing device utilizing one or more cryptographic keys to encrypt or decrypt data.

A data storage device is typically either a spinning magnetic disk or a solid state drive. A data storage device in some examples includes, without limitation, one or more hard disks, one or more flash drives, as well as any other type of device for storing data.

In some examples, a computing device includes a data storage subsystem that manages all of its locally attached data storage devices. The computing device may include one or more data storage devices storing data, such as encrypted data 110. Additionally, the computing device 102 may represent a group of processing units or a group of other computing devices.

Encrypted data 110 is any type of data encrypted using a cryptographic key, such as a symmetric or asymmetric cryptographic key. Encrypted data 110 includes data of type of data of any size. For example, encrypted data 110 may include a data block, an entire disk, a file, an object, or the like.

In some non-limiting examples, metadata is optionally associated with the encrypted data 110. The metadata is data describing other data. The metadata includes a key identifier (ID) of the encryption key stored on external key server 108 that is used to encrypt the data. The metadata is used to determine which encryption key is capable of decrypting the encrypted data. In this non-limiting example shown in FIG. 1, the metadata includes a key ID identifying which key(s) to retrieve for use in decrypting the encrypted data 110.

A client, such as client 104 and 106 is implemented as a computing device, such as computing device 102. Clients 104 and/or 106 may be computing devices associated with a user. The clients 104 and 106 in this example are separate computing devices from computing device 102. In other words, the client 104 and 106 in some examples is located separately from or remotely to computing device 102.

In some examples, but without limitation, clients 104 and/or 106 are implemented as portable computing devices, such as, but without limitation, a smart phone, laptop, tablet, computing pad, netbook, gaming device, portable media player, or a wearable computing device, such as, without limitation, a smart watch. A portable computing device may also be referred to as a mobile computing device.

The key server 108 is an external cryptographic key management component hosted on one or more servers remote to the computing device 102. The key server 108 includes a random number generator for generating cryptographic keys. The key server 108 generates, stores, and/or transmits one or more keys for one or more clients.

In this example, the key server 108 stores a set of keys 118. The set of keys 118 includes keys 112, 114, and 116. However, in other examples, the key server 108 may store a single key, two keys, as well as four or more keys.

The keys in the set of keys 118 may be implemented as any type of cryptographic key having any key bit size. The key bit size may also be referred to as a key length. The keys stored on the key server may also include encrypted keys as well as unencrypted keys. An encrypted key may be referred to as a wrapped key.

The key server 108 in some examples stores one or more keys generated by the key server 108. In other examples, the key server 108 stores one or more keys generated by a client, such as computing device 102, a different key server, user, or other entity capable of generating keys.

Each key stored on the key server 108 is associated with one or more clients. The key server 108 may store one or more keys for a given client. In other words, a single client may store multiple different keys on a single key server. Likewise, the key server 108 may store multiple different keys for each client in a plurality of different clients.

In this non-limiting example, the computing device 102 is depicted as utilizing only a single key server 108. However, in other examples, a client such as computing device 102 may utilize two or more different key servers to generate, store, and transmit cryptographic keys to the computing device 102 via network 124.

In one example, the network 124 may be the Internet, intranet, Ethernet, or other wireless or hardwired connections by which the computing device 102 may send and receive data associated with one or more other computer systems, such as, but without limitation, client 104, client 106, key server 108, as well as any other computing device(s) and/or key server(s).

The computing device 102 communicates with the key server 108 across the network 124. In one example, a client, such as the computing device 102, transmits a key ID to the key server 108 via the network 110. In response, the key server 108 returns a key value corresponding to the key ID to the client across the network 124.

The computing device 102 in this non-limiting example optionally includes a processor 120 and a memory 122 storing computer executable code 126, a local copy of a set of keys 128, and/or one or more application(s) 130. The computer executable code 126 may also be referred to as computer executable program instructions.

The processor 120 includes any quantity of processing units. In some examples, the processor 120 includes a central processing unit (CPU) "A" and a CPU "B" (not shown). In other examples, the processor 120 may include only a single processing unit, as well as three or more processing units.

The processor 120 is programmed to execute computer-executable code 126 for implementing aspects of the disclosure. The execute computer-executable code 126 may be performed by the processor or by multiple processors within the computing device, or performed by a processor external to the computing device. In some examples, the processor is programmed to execute instructions such as those illustrated in the figures (e.g., FIG. 8, FIG. 9 and FIG. 10).

In some examples, the processor 120 represents an implementation of analog techniques to perform the operations described herein. For example, the operations may be performed by an analog computing device and/or a digital computing device.

The computing device 102 further has one or more computer readable media, such as the memory 122. The memory 122 includes any quantity of media associated with or accessible by the computing device. The memory 122 may be internal to the computing device (as shown in FIG. 1), external to the computing device (not shown), or both (not shown). In some examples, the memory 122 includes read-only memory and/or memory wired into an analog computing device.

The memory 122 stores a local copy of one or more keys in a local copy of set of keys 128 and/or one or more applications 126. The local copy of the set of keys 128 includes a copy of one or more keys received or downloaded from the key server 108 and stored in a volatile memory, such as a cache. When the computing device 102 loses power or reboots, the local copy of the set of keys 128 is lost or deleted.

The applications 130, when executed by the processor 120, operate to perform functionality on the computing device 102. Exemplary applications include mail application programs, web browsers, calendar application programs, address book application programs, messaging programs, media applications, location-based services, search programs, and the like. The applications may communicate with counterpart applications or services, such as web services accessible via the network 124. For example, the applications may represent downloaded client-side applications corresponding to server-side services executing in a cloud.

The memory 122 further stores one or more computer-executable components. Exemplary components include a communications interface component 132, a user interface component 134 and a server polling component 136.

In some non-limiting examples, the server polling component 136, when executed by the processor of the computing device 102, causes the one or more processor(s) 120 to periodically poll the server to obtain a status of one or more keys stored on the key server.

In some examples, the server polling component polls the server by sending a status request to the key server 108 at pre-determined polling time intervals. A status request in some examples is a request for one or more keys. In other examples, the status request is a query asking whether the key would be provided if the key were requested.

The status request is sent to the key server by the server polling component at an occurrence of each polling time interval. The status check periodically checks with the key server to determine if the one or more keys are still available and/or still retrievable.

Examples of polling time intervals include, for example but without limitation, a sixty second time interval, a five minute time interval, a thirty minute time interval, a one hour time interval, a two hour time interval, a twelve hour time interval, or any other time interval selected by a user.

For example, if the polling time interval is one hour, the server polling component sends a status request to the key server. If a key available or key enabled status is received from the key server, the server polling component waits an hour until the next polling time interval occurs before sending a next status request to the key server.

The polling time interval may be a default polling time interval, a user-defined polling time interval, or a set of time intervals that changes based on the date, the time of day, day of the week, holidays, number of cryptographic keys in use, number of cryptographic keys in volatile memory, or other variables. For example, on a weekday, the polling time interval may be a thirty minute polling time interval in the morning and a two hour polling time interval in the afternoon when the network is busier. In another example, the polling time interval may be ninety minutes on weekdays and thirty minutes on weekends, or vice versa.

In this example, the computing device 102 obtains one or more cryptographic keys, such as key 116, from the key server 108 and stores the one or more keys in the local copy of the set of keys 128 in volatile memory. The volatile memory may be referred to as temporary memory. The computing device 102 utilized the local copy of the set of keys 128 to decrypt encrypted data 110 to generate unencrypted data 136. The unencrypted data 136 is optionally output to a user via an input/output device 138.

In other examples, the computing device 102 includes a communications interface component 132. The communications interface component 132 includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

The computing device 102 optionally includes a user interface component 134. In some examples, the user interface component 134 includes a graphics card for displaying or outputting decrypted data to the user and receiving input data or commands from the user. The user interface component 134 may also include computer-executable instructions (e.g., a driver) for operating the graphics card. Further, the user interface component 134 may include a display and/or computer-executable instructions (e.g., a driver) for operating the display. A display may include, for example, a touch screen display or natural user interface. In other examples, the user interface component 134 includes a graphical user interface (GUI). In other examples, the user interface component 134 includes a web browser.

The computing device 102 may also include one or more input/output device(s) 138 to provide data to one or more users and/or receive data from one or more users. The input/output device(s) may include, without limitation, one or more speakers, a sound card, a camera, a microphone, a vibration motor, one or more accelerometers, a BLUETOOTH brand communication module, global positioning system (GPS) hardware, and a photoreceptive light sensor. For example, a user may input commands or manipulate data by moving the computing device 102 in a particular way.

In other examples, the input/output (I/O) device(s) 138 include a display, such as a monitor, liquid crystal display (LCD), touch screen, plasma screen, image projection, holographic screen, holographic display, or any other type of visual display for displaying data, graphics and/or other images. The computing device optionally includes hard drives and/or SSDs connected to the computing device components through I/O devices 138.

The computing device 102 in some examples optionally includes an application programming interface (API) (not shown). In some examples, the API is optionally implemented as a Representational State Transfer (REST) API. For example, a REST API may be used in connection with a data storage system. A request may be issued via a REST API to GET data from a server. In response, the server returns the requested data via one or more REST API responses.

Figure 2:
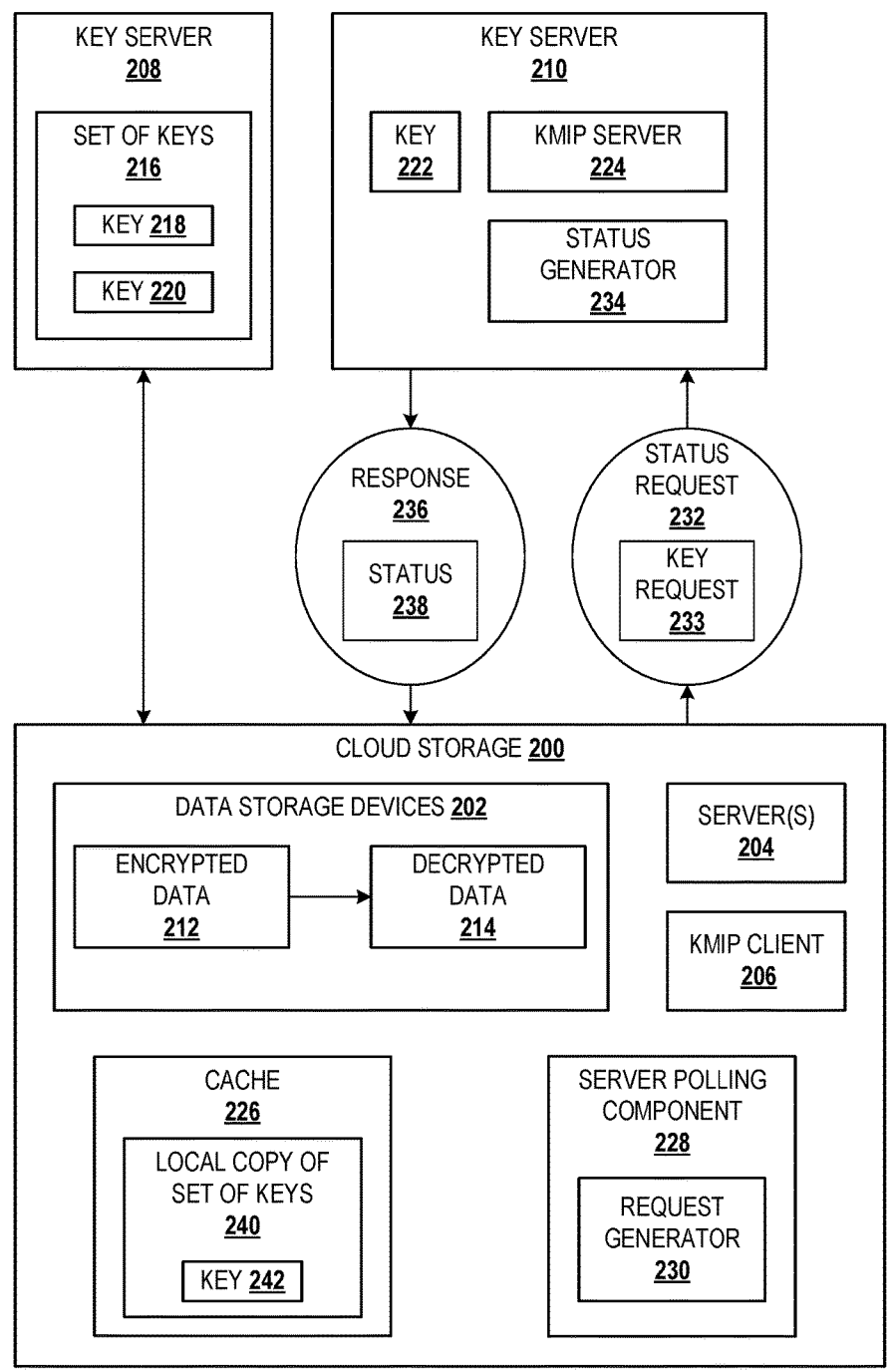
FIG. 2 is an exemplary block diagram illustrating a server polling component associated with cloud storage

Turning now to FIG. 2, an exemplary block diagram illustrating a server polling component associated with cloud storage is shown. Cloud storage 200 comprises one or more data storage devices 202 providing data storage to one or more clients. The cloud storage 200 optionally also includes one or more servers 204.

A server in the one or more server(s) 204 may include an application server, a cloud server, software as a service (SaaS) server, a web server, a blade server, or any other type of server. Server(s) 204 optionally include Key Management Interoperability Protocol (KMIP) client 206 for communicating with key server(s) 208 and/or 210. KMIP is a network protocol providing standards for communications between storage systems and key servers. KMIP provides a syntax in which messages between the computing device and key server are encoded. However, the examples are not limited to utilizing KMIP. For example, the server(s) 204 may also include one or more APIs (not shown) for communicating with one or more other computing devices.

Data storage devices 202 include one or more devices for storing data, such as encrypted data 212 and/or decrypted data 214. The data storage devices 202 may include a data structure, a file system, and/or a database for storing and managing data. In some examples, the one or more data storage devices 202 may be located in a single physical location. In other examples, the one or more data storage devices are distributed data storage devices located in two or more different physical locations.

A client accesses data stored on one or more of the data storage devices 202 remotely via a network connection. The network connection may be any type of network connection, including an Internet connection, an Ethernet connection, or any other type of network.

Key server 208 and key server 210 are key servers for generating, storing and/or sending one or more cryptographic keys to one or more clients, such as key server 108 in FIG. 1. Key server 208 in this example stores a set of keys 216. The set of keys 216 includes one or more keys, such as key 218 and key 220. Likewise, key server 210 stores key 222. In this example, the key server 210 is located remotely from key server 208.

In some examples, the key servers may include a KMIP server implementation, such as KMIP server 224, for communicating with clients and other customers of the key server, such as cloud storage 200.

In this non-limiting example, cloud storage 200 requests one or more keys from one or more key servers, such as key servers 208 and 210. The cloud storage 200 stores a local copy of the set of keys 240. The local copy of the set of keys 240 includes a copy of one or more keys received from the key server(s), such as key 242. The local copy of the one or more key(s) is stored on volatile memory, such as a temporary cache 226.

A server polling component 228 sends a status request to the one or more key servers at a polling time interval. The polling time interval is a pre-determined time interval. In some examples, the polling time interval is a user defined time interval selected by a user, such as, but not limited to, an administrator.

In some examples, the server polling component 228 includes a request generator 230. The request generator 230 generates the status request 232 sent to the key server 210 at an occurrence of a polling time interval. The status request 232 optionally includes a key request 233 requesting a key from a server. In other examples, the status request 232 is a request for a current status of a key. The request for the current status of the key in some examples is a query to the key server asking for a status or indicator as to whether the key would be returned if the key were requested from the key server without actually requesting the one or more keys from the key server.

The status request 232 in these examples may be sent using any application for sending, receiving, retrieving, or traversing data on the Internet and/or the World Wide Web (WWW), such as, but not limited to, a web browser, a cloud application, or any other type of application for sending and/or receiving data. In other examples, the status request is sent to the one or more key servers via the network connection, such as network 124 in FIG. 1.

The key server 210 receives the status request 232. The key server may be set to enable one or more keys or disable one or more keys. A key is enabled if the key server sends the key in response to the status request or the key server sends a response indicating that the key would be sent if requested. A key is disabled if the key is not sent in response to the status request and/or a response indicating the key would not be sent if requested. Keys may be disabled by deleting one or more keys off the key server, deleting an encryption key used to encrypt one or more keys, or otherwise stopping the key server from sending one or more keys to one or more clients.

In some examples, a key stored on a key server may be disabled or made unavailable to prevent an unauthorized party from obtaining a copy of the key stored on the key server. If an unauthorized party obtains access to encrypted data and/or obtains physical access to a data storage device storing the encrypted data, the key server is sometimes instructed to stop sending the encryption keys corresponding to the encrypted data and/or stop sending one or more keys belonging to the client associated with the encrypted data. In other examples, the key server is instructed to delete the one or more keys or delete a key encryption key for decrypting one or more keys corresponding to the potentially compromised encrypted data. In such cases, the key server responds to a status request by sending a key disable status or key unavailable response.

In this example, a status generator 234 optionally generates a response 236 to the status request 232. The response 236 indicates if the one or more keys are still available or enabled by sending a key available response 236 including a key enabled status 238. In other examples, the response 236 indicates one or more keys stored in the local copy of the set of keys 240 is disabled or unavailable from the key server by sending a key unavailable response having a key disabled status for the one or more keys. In some examples, the key server(s) transmit the response 236 to requesting client, such as cloud storage 200, via the network.

On receiving a key available response and/or a key enabled status from the one or more key servers, the cloud storage continues utilizing the local copy of the set of keys 240 for encrypting and decrypting data. In other words, the cloud storage continues operations using the local copies of the keys.

In this example, the response 236 does not include a copy of any keys. The one or more keys were previously received from the key server. Local copies of the keys are already stored in cache on the cloud storage. The cloud storage does not request new copies of the keys or receive keys in the response 236. The response 236 in these examples indicates whether the key server would send the keys and/or indicates if the keys are still valid, enabled keys.

A key unavailable response indicates the key server is configured to stop providing the one or more keys. On receiving a key unavailable response and/or a key disabled status from the one or more key servers indicating that the key server is no longer providing copies of the one or more keys to requesting clients, the cloud storage 200 initiates a key failure action. The key failure action is an action to prevent unauthorized access to one or more keys stored locally on the client, such as the cloud storage. The key failure action in some examples includes deleting all local copies of keys from cache or shutting down one or more data storage devices, such as by powering down one or more data storage devices of the cloud storage.

In some examples, the key failure action is performed immediately on receiving the key unavailable response and/or identifying the disabled status of one or more keys. In other examples, the key failure action is performed following a wait time and/or following sending a notification prior to shutting down the data storage in whole or in part.

In some examples, a key server may fail to send any response to a status request from a server polling component of a client, such as cloud storage. The key server may fail to send a response if a network connection is broken, the key server is having technical difficulties, or the key server has been compromised or shut down. The server polling component may likewise fail to receive a response from the key server is the client hosting the key server component has lost network connectivity or is experiencing technical difficulties.

In some examples, if a response 236 is not received from the one or more key servers within a threshold response wait time, the server polling component resends the status request to the one or more key servers after waiting a retry time interval.

The retry time interval is an amount of time the server polling component waits prior to sending a second status request after a first status request to the key server without receiving any response from the key server. In some examples, the retry time interval is a same amount of time as the polling time interval. For example, if the polling time interval is one hour, the server polling component waits one hour before sending another status request even if no response to the request is received.

In other examples, the retry time interval is a shorter amount of time than the polling time interval. For example, if the polling time interval is an hour, the retry time interval for resending the request may be ten minutes. In this example, the server polling component resends the status request every ten minutes until a response is received from the key server or until a time out occurs. If a response is received after the second retry attempt, the server polling component sends the next status request one hour after the last response to the second retry attempt was received from the key server.

The time out period is the maximum amount of time the server polling component waits after sending a status request at a polling time interval before performing the key failure action due to a lack of response from the key server. If the key server is unreliable or crashes, the time out period enables the data storage to continue operating despite a lack of communication/response from the key server for the time out period. This provides a time out period for the key server to restore connectivity and/or repair any technical problems during which the data storage is permitted to continue operating despite the lack of response.

In one non-limiting example, the server polling component polls the server at a retry interval of five minutes for a time out period of three hours. In this case, the status request is resent every five minutes for three hours. If a response is not received during the three hour time out period, the key failure action is performed.

In some examples, the time out permits a trade-off between security and availability of the data storage. The data storage in some examples is shut down entirely or one or more arrays of the data storage are shut down at the end of the time out period without a response from the key server for a pre-determined period of time.

In other examples, the server polling component iteratively sends status requests to the server at retry time intervals until a maximum number of status request retry attempts is reached. The maximum number of status requests is a threshold number of retry status requests that are sent without receiving a response from the key server before the key failure action is performed. For example, a retry time interval may be one hour with a maximum number of retry attempts set to 5 attempts. The server polling component in this example sends a status request every hour until five status requests have been made five hours later. The maximum number of retry attempts is utilized in some examples instead of the time out interval.

In still other examples, if a client or data storage sends status requests to two or more key servers. If a response from a key server is not received from one key server within the time out period, the computing device 102 only deletes the one or more keys associated with the key server that failed to respond to the status request. Likewise, if a key unavailable or a disabled status is received from one key server, the computing device only deletes the one or two keys associated with the key server sending the key unavailable or disable status. The keys associated with a key server are the keys that are generated by the key server, stored by the key server, and/or received from that key server.

In still other examples, two or more key servers are utilized by the data storage for redundancy. In these examples, if a key available response is received from any one of the redundant key servers, the server polling component maintains the copies of the keys and continues normal operations using the keys. The server polling component only initiates a key failure action if a key unavailable response is received from one or more key servers or if no response is received from any of the redundant key servers. When no response is received from a key server, this may be referred to as a response failure.

Figure 3:
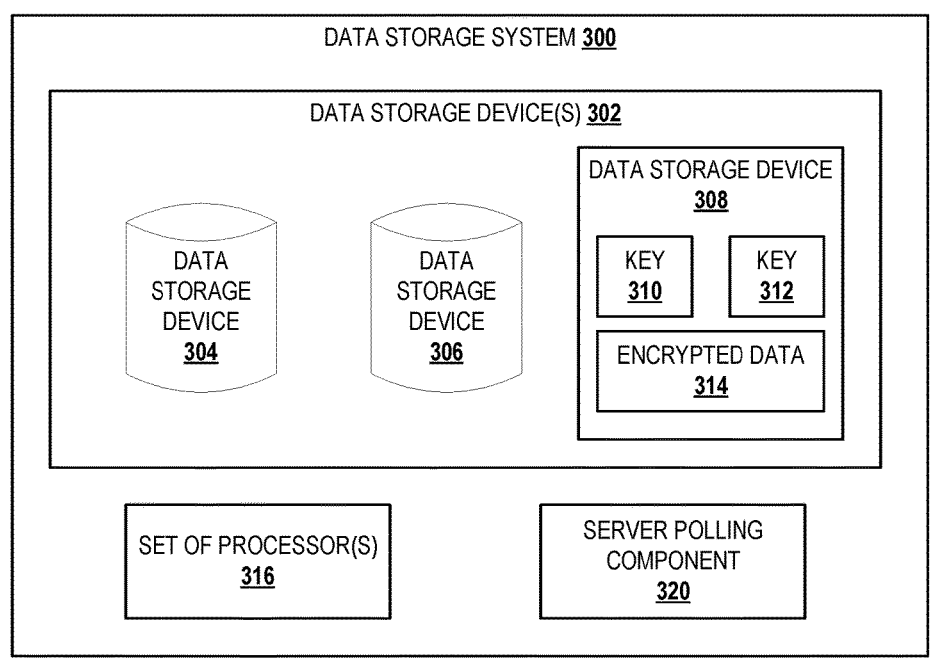
FIG. 3 is an exemplary block diagram illustrating a data storage system.

FIG. 3 is an exemplary block diagram illustrating a data storage system. The data storage system 300 is a system for storing and managing data. The data storage system 300 includes a set of one or more data storage device(s) 302.

Data storage device(s) 302 may include, for example, without limitation, one or more optical disks, one or more solid state drives (SSDs), such as flash drives, and/or one or more rotating magnetic storage devices, such as hard disk drives. A data storage device in other examples may be implemented as a redundant array of inexpensive disks (RAID) array, an optical storage array, or any other type of data storage array.

In this non-limiting example, data storage device(s) includes data storage device 304, data storage device 306 and data storage device 308. However, the examples are not limited to three data storage devices. In other examples, the data storage system 300 may include a single data storage device, two data storage devices, as well as four or more data storage devices.

In still other examples, the data storage system 300 is optionally housed in a data center. A data center is a facility that may include a one or more networked computer servers, data storage devices, as well as other hardware and software for storing and managing data. In other examples, the data storage system is housed in shared spaces.

The data storage system 300 includes a set of processor(s) 316 and a server polling component 320. The server polling component 320 is a component for polling one or more key servers. The server polling component 320 sends status requests to the one or more key servers at one or more polling times occurring at pre-determined polling time intervals.

In this example, the data storage device 308 includes encrypted data 314 and a set of keys, including key 310 and key 312, stored locally on the data storage system 300. In other examples, the keys 310 and 312 are not stored locally on the data storage system. Instead, keys 310 and 312 are stored on one or more remote key servers.

Although this example depicts two keys stored on the data storage system 300, the data storage system 300 may store any number of keys. For example, the data storage system may store a single key, as well as three or more keys.

The encrypted data 314 is data encrypted using one or more secret cryptographic keys. In this example, only encrypted data 314 is shown on data storage device 308. However, a data storage device may also store unencrypted data, as well as decrypted data.

The encrypted data 314 is depicted as data associated with a single client, partition and/or data set. However, in other examples, encrypted data 314 may include data associated with a plurality of different clients stored on a plurality of different partitions or data sets within the data storage system 300.

In some examples, part of the encrypted data within the encrypted data 314 may be data associated with a client "A" while another part of the encrypted data within the encrypted data 314 may be data belonging to or associated with a client "B". The part of the encrypted data for client "A" may be unencrypted using an first key while the part of the encrypted data for client "B" may be unencrypted using a different, second key belonging to client "B." In other words, there may be multiple different keys provided by multiple different key servers that are used for encrypting and decrypting different parts of data stored on data storage for multiple different clients.

Figure 4:
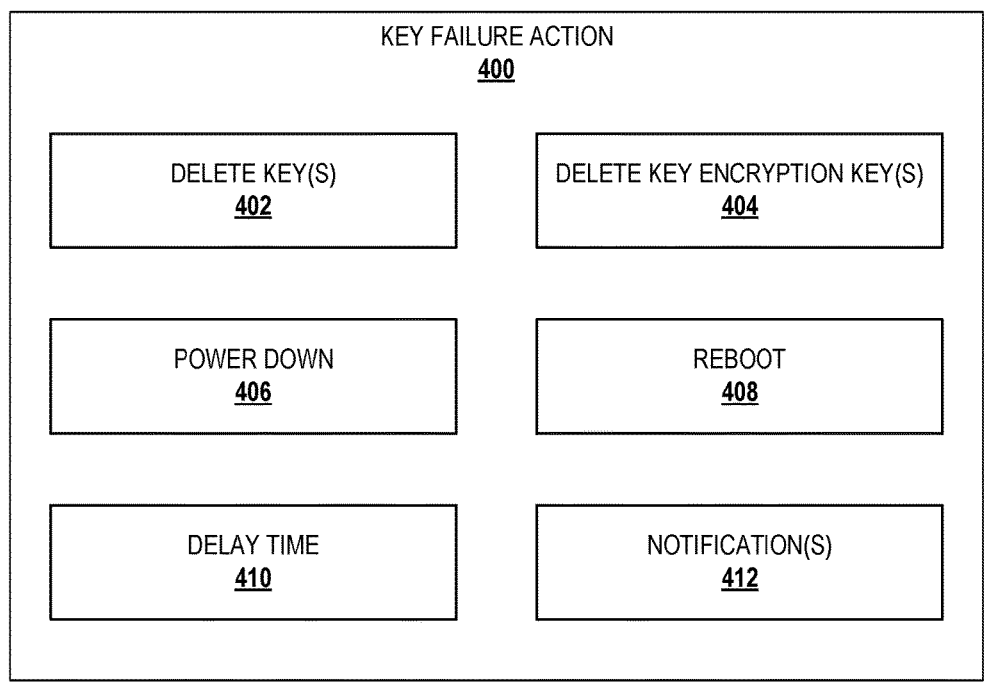
FIG. 4 is a block diagram illustrating a key failure action.

FIG. 4 is a block diagram illustrating a key failure action. The key failure action 400 in some examples includes deleting key(s) 402. In this example, the key failure action involves deleting the local copy of one or more keys stored on volatile memory of the client or data storage. In other examples, deleting keys includes deleting all encryption keys stored locally on the client or data storage associated with the server polling component. In other examples, the key failure action 400 includes deleting only a single key from the cache but retaining the remaining keys in the cache or deleting two or more keys from the cache but retaining one or more other keys in the cache.

The key failure action 400 in some examples includes a delete key encryption key 404 action. A delete key encryption key action includes deleting one or more key encryption keys stored on the client or data storage. A key encryption key is a key used to encrypt or decrypt another key.

A power down 406 is performed as part of the key failure action 400 in some examples. A power down 406 includes shutting down or powering down one or more data storage devices. For example, power to a single data storage device may be turned off or power to all data storage devices associated with a data storage system may be stopped to disable the one or more data storage devices. The key failure action shuts down the data storage device to prevent an unauthorized party from gaining access to data and/or keys stored on the data storage device.

Another key failure action 400 includes a reboot 408 of one or more data storage devices. A reboot 408 may also include a reboot of an entire data storage system. The reboot causes data stored in volatile memory, such as local copies of keys in cache, to be erased or lost. Likewise, some computing devices require an ignition key or other input be entered by an authorized user on reboot before the computing device resumes normal operations. In this manner, a reboot prevents an unauthorized user having physical access to a data storage device from utilizing the data storage device after the reboot.

In some examples, the key failure action 400 is implemented immediately on receiving a key unavailable response and or a key disabled status from a key server. In other examples, the key failure action 400 includes a delay time 410. The delay time 410 is a time interval after receiving a key unavailable response prior to performing the key failure action 400. The delay time is a user defined period of time. The delay time may be, for example but without limitation, a second, five seconds, five minutes, or any other delay time before performing the key failure action 400.

The key failure action is implemented after the delay time, in some examples, to enable the server polling component to send a notification 412 to one or more users associated with one or more client devices. The notification may include, without limitation, a notification of the key failure action to be performed, a notification of the key unavailable response, a notification of the key disable status, and/or a request for confirmation from the user.

In other examples, the server polling component sends a notification to a user or administrator after each failed retry attempt. In other words, as each status request is resent after each retry interval without receiving a key or other response from the server, a notification of the failed retry status request is sent to a client device associated with a user.

The delay time in some examples is provided to provide notice of the pending shut down or deletion of key(s). The notification in other examples enables a user to prevent the key failure action from being implemented. For example, the user, such as an administrator or other entity, optionally stops or delays performance of the key failure action by providing a user input, ignition key or other. A user input may include a user login, a password, a key, voice recognition, a combination of a login and password, or other input provided. An ignition key may be provided via a Universal Serial Bus (USB), memory stick, or other input device.

Figure 5:
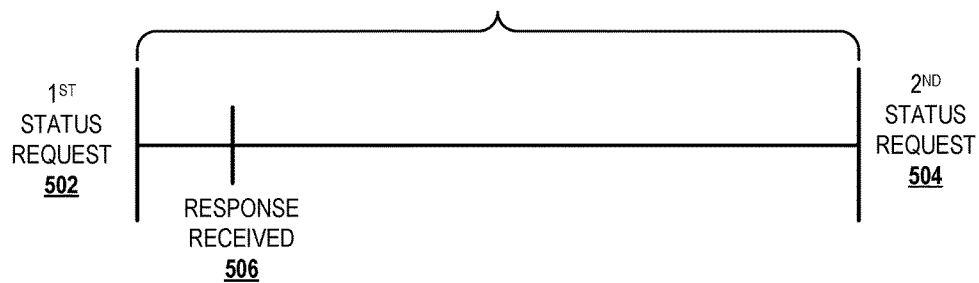
FIG. 5 is a block diagram illustrating a polling time interval.

FIG. 5 is a block diagram illustrating a polling time interval. The polling time interval 500 is the interval of time from sending a first status request 502 and sending a second status request 504 when a response 506 to the first status request 502 is received from the key server. The polling time interval 500 is any pre-determined period of time the server polling server waits between sending a next status request where a key and/or other response is received to the previous status request.

The polling time interval 500 may be any period of time. Examples of polling time intervals include, but are not limited to, one second, ten seconds, five minutes, thirty minutes, ninety minutes, four hours, twenty-four hours, thirty hours, twenty-four hours, or any other time interval. The polling time is the time at which the polling time interval is reached and a next status request is sent to the server. In other words, the status request is sent when the polling time is reached. If the last status request was sent at 2:00 p.m. and the polling time interval is one hour, the next polling time for sending the next status request to the server is at 3:00 p.m.

In some examples, the polling time interval 500 varies depending on one or more factors, such as the time of day, the day of the week, the day of the month, holidays, or any other factors. For example, a first polling time interval applies during the night and a second, different polling time interval is applied during the day and/or during regular business hours. In still another example, a third, different polling time interval is applied on weekends.

For example, a first polling time interval may be one hour, a second polling time interval may be three hours, and a third polling time interval may be twelve hours. The different polling time intervals in this example are utilized on different days and/or at different times of the day.

The polling time interval in other examples is adjusted or updated by a user to change the amount of time between sending of status request from a first a first polling time interval to a second, different polling time interval. In one example, the update to the polling time interval is a dynamic update performed by the user during the server polling process.

The duration of the polling time interval is determined based on a tradeoff between security and performance. A less frequent polling/longer polling time interval results is improved performance and less burden on the processor and network resources. A more frequent polling with shorter polling time results in greater security of data and keys. The user selects the polling time interval based on the performance versus rapid response considerations.

Figure 6:
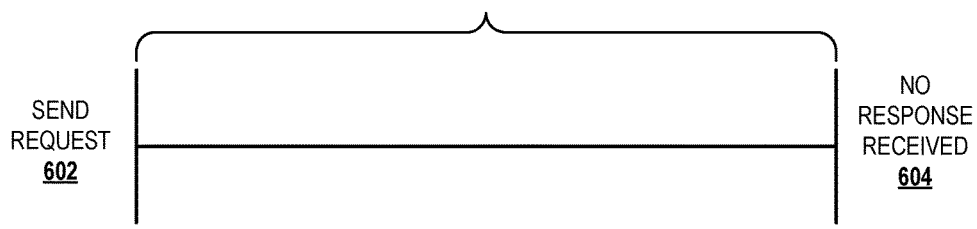
FIG. 6 is a block diagram illustrating a response wait time.

FIG. 6 is a block diagram illustrating a response wait time 600. The response wait time 600 is the amount of time the server polling component waits to receive a response to a status request before determining that no response has been received and proceeding to retry sending the status request. The response wait time 600 begins when the status request is sent at 602. If a response is not received by 604 within the response wait time 600, the server polling component identifies a no response situation and determines whether a retry time interval has passed and whether a time out has expired.

The response wait time in some examples is a user defined amount of time. The response wait time in other examples is adjusted or updated by a user to change the response wait time from a first response wait time to a second response wait time. In one example, the update to the response wait time is a dynamic update performed by the user during the server polling process.

Figure 7:
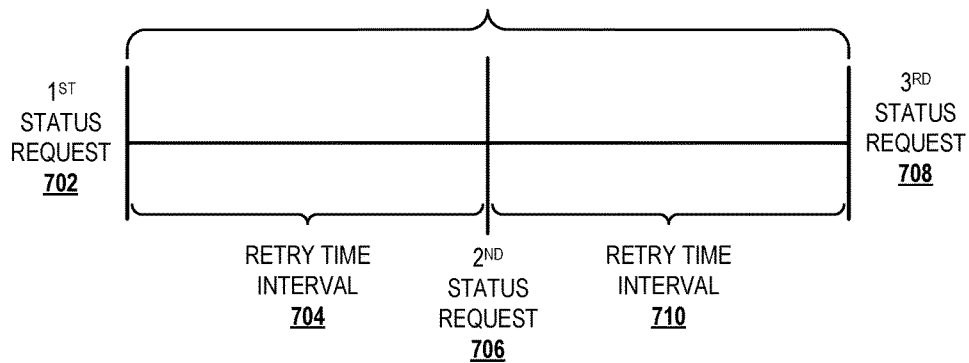
FIG. 7 is a block diagram illustrating a time out interval.

FIG. 7 is a block diagram illustrating a time out interval. The time out interval 700 is an amount of time during which status requests are sent to the server without receiving a response back from the server. When the time out interval 700 expires, a key failure action is performed.

In this example, a first status request is sent at 702 and a response is not received from the server. After a first retry time interval at 704, a second status request 706 is sent to the server. If a response to the second status request is not received and the time out has not yet expired, a third status request 708 is sent at the end of the second retry time interval 710.

In this example, the first retry time interval 704 and the second retry time interval 710 is the same time interval. In other words, if the first retry time interval is fifteen minutes, the second retry time interval is also fifteen minutes.

However, in other examples, the first retry time interval may be a different time interval than a second retry time interval. Likewise, a third retry time interval may be a different time interval than the first and second retry time intervals. For example, if a first retry time interval is fifteen minutes, the second retry time interval is ten minutes and the third retry time interval is five minutes. In this manner, the server polling component may send more frequent retry attempts to obtain a response from the server as the duration of time without contact or response from the server increases.

In other examples, a different time out period is associated with different clients, different data storage devices, and/or different data sets. For example, a first time out period of six hours is applied to a first client and a second, different time out period of ten hours is applied for a second client. In such cases, when the first time out period of six hours expires the keys belonging to the first client are deleted, but the keys belonging to the second client are maintained for four more hours until the second time out period expires at the later time. Only when the second time out period expires are the one or more keys belonging to the second client deleted.

In another example, when a first time out expires a first data storage device is shut down but a second data storage device is not shut down until a different, second time out associated with the second data storage device expires.

In still another example, a first data set is associated with a first time out and a second data set is associated with a second time out period. When the first time out period expires, the keys required to decrypt the first data set are deleted. The keys associated with the second data set are maintained in memory until the second time out period expires.

The time out period enables a trade off between security and availability of the data storage. If an unauthorized party gains control of the data storage a shorter time out period is desirable. In other words, an unauthorized party may have control of the data storage until the end of the time out. However, if a key server temporarily goes down or suffers a network outage due to a technical problem, it is desirable to have a longer time out period to keep the data storage operational and available for utilization by clients and/or customers.

FIG. 8 is an exemplary flowchart illustrating a process for polling a server for a key status. The process shown in FIG. 8 may be implemented by a computing device, such as, but without limitation, computing device 102 in FIG. 1, one or more server(s) 204 in FIG. 2, or data storage system 300 in FIG. 3.

The process sends a status request to a server, such as a key server, at 802. On determining a response to the status request is received at 804, a determination is made as to whether a key is enabled at 806. If the key is enabled, the process continues using the key at 808. The process terminates thereafter.

If a response is received at 804 and the key is not enabled at 806, the process performs a key failure action at 812. The process terminates thereafter.

Returning to 804, if a response is not received from the server, a determination is made as to whether a time out has been reached at 810. If the time out is reached, a key failure action is performed at 812. The process terminates thereafter.

Returning to 810, if a time out is not reached, the process returns to 802 to send another status request to the server at 802. The process iteratively sends status requests until a response is received or the time out is reached.

While the operations illustrated in FIG. 8 are described as being performed by a client computing device or data storage system, aspects of the disclosure contemplate that performance of the operations by other entities. For example, a cloud service may perform one or more of the operations.

FIG. 9 is an exemplary flowchart illustrating a process for key server polling. The process shown in FIG. 9 may be implemented by a computing device, such as, but without limitation, computing device 102 in FIG. 1, cloud storage 200 in FIG. 2, one or more server(s) 204 in FIG. 2, or data storage system 300 in FIG. 3.

The process receives a set of keys at 902. The keys are stored in memory at 904. A determination is made as to whether a polling time is reached at 906. If a polling time is not reached, the process returns to 906.

When the polling time is reached, the process sends a key request to a server at 908. If a key is received at 912, the process continues using the set of keys at 918. The process returns to 906 and iteratively sends status requests at each polling time until a key is not received at 914.

If a key is not received, the process performs a key failure action at 916. The process terminates thereafter.

While the operations illustrated in FIG. 9 are described as being performed by a client computing device or data storage system, aspects of the disclosure contemplate that performance of the operations by other entities. For example, a cloud service may perform one or more of the operations.

FIG. 10 is an exemplary flowchart illustrating a process for resending status requests to an unresponsive key server. The process shown in FIG. 10 may be implemented by a computing device, such as, but without limitation, computing device 102 in FIG. 1, cloud storage 200 in FIG. 2, one or more server(s) 204 in FIG. 2, or data storage system 300 in FIG. 3.

The process sends at status request to a server at 1002. A determination is made as to whether a response wait time is reached at 1004. If no, the process returns to 1004 until the response wait time is reached.

When the response wait time has passed at 1004, the process determines if a response is received at 1006. If yes, the process determines if a key disabled status is received at 1008. If no, a next polling time is identified at 1010, with the process sending a next status request at 1002.

Returning to 1006, if a response is not received, the process determines whether a retry time interval is reached at 1012. If no, the process returns to 1014 until the retry time interval is reached at 1012. The process determines if a time out has expired at 1014. If no, the process resends the status request to the server at 1002. The process iteratively sends status requests to the server until a response is received or until the time out expires at 1014. When the time out expires at 1010, the process deletes the one or more keys from the memory at 1016. The process terminates thereafter.

Returning to 1004, if a response is received that includes a key disabled status at 1008, the process deletes the one or more keys from memory at 1016. The process terminates thereafter.

While the operations illustrated in FIG. 10 are described as being performed by a client computing device or data storage system, aspects of the disclosure contemplate that performance of the operations by other entities. For example, a cloud service may perform one or more of the operations.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer readable instructions, data structures, program modules, or the like in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating wrapping keys for encrypting and decrypting data for a computing system. For example, the elements illustrated in FIG. 1, such as when encoded to perform the operations illustrated in FIG. 8, FIG. 9 and/or FIG. 10, constitute exemplary means for polling a key server.

More specifically, the server polling component illustrated in FIG. 1, such as when encoded to perform the operations illustrated in FIG. 8, FIG. 9 and/or FIG. 10, constitute exemplary means for receiving a set of keys from a key server, exemplary means for storing the keys locally on a memory, exemplary means for sending a status request to the key server at a polling time, and exemplary means for performing a key failure action if a key unavailable response is received or no response is received within a time out period.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it is apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:

receiving, at the one or more processors over a network, a local copy of a set of keys from an external key server located remotely from a data storage;

initiating utilization of the local copy of the set of keys for one or more of encrypting data and decrypting data, the local copy of the set of keys comprising at least one cryptographic key associated with encrypted data stored on the data storage;

storing the local copy of the set of keys in a memory of the data storage;

on occurrence of a polling time interval, sending, over the network by the one or more processors executing a server polling component, a status request to the external key server requesting a status of the set of keys stored on the external key server;

on determining a key available response to the status request is received from the external key server at the one or more processors over the network, continuing the utilization of the local copy of the set of keys, the key available response indicating an enabled status of the set of keys stored on the external key server; and on determining a key unavailable response to the status request is received from the external key server at the one or more processors over the network, performing a key failure action to prevent the continued utilization of the local copy of the set of keys, the key unavailable response indicating at least one key in the set of keys stored on the external key server is disabled.

2. The computer-implemented method of claim 1 wherein the status request is a first status request and further comprising:

on determining a response wait time has passed without receiving a response to the first status request from the key server, sending a second status request to the key server;

on determining the response wait time has passed without receiving a response to the second status request from the key server, sending a third status request to the key server.

3. The computer-implemented method of claim 2, wherein the server polling component iteratively sends status requests to the key server at retry time intervals until a maximum number of status request retry attempts is reached, and further comprising:

on determining the maximum number of retry attempts have been made without receiving a response from the key server, performing the key failure action, wherein the maximum number of retry attempts is a threshold number of status requests the data storage sends to the key server at the retry time intervals without receiving a response to the status requests prior to performing the key failure action.

4. The computer-implemented method of claim 1, wherein the server polling component iteratively sends another status request to the key server at retry time intervals until a response is received from the key server or a time out period is reached, and further comprising:

on occurrence of the time out period without receiving a response from the key server, performing the key failure action, wherein the time out period is a maximum length of time for sending status requests to the key server at the retry time intervals without receiving a response to the status requests from the key server.

5. The computer-implemented method of claim 1 wherein performing the key failure action further comprises:

deleting the at least one key from the memory.

6. The computer-implemented method of claim 1, wherein performing the key failure action further comprises:

rebooting the data storage.

7. The computer-implemented method of claim 1, wherein performing the key failure action further comprises:

disabling at least one data storage device associated with the data storage.

8. The computer-implemented method of claim 1, wherein performing the key failure action further comprises:

sending a notification of initiation of the key failure action to at least one user.

9. The computer-implemented method of claim 1, wherein the key server is a first key server, and further comprising:

on occurrence of the polling time event, sending the status request to a set of key servers, the set of key servers comprising the first key server and a second key server, the first key server located remotely to the second key server;

on determining a key available response to the status request is received from both the first key server and the second key server, continuing utilization of the set of keys; and on determining a key unavailable response to the status request is received from at least one key server in the set of key servers, performing a key failure action, the key failure action preventing continued utilization of the at least one key in the set of keys.

* * * * *